Sept. 12, 1939.  A. C. BROWN  2,173,070
VALVE AND WATER SUPPLY MECHANISM
Filed March 2, 1939
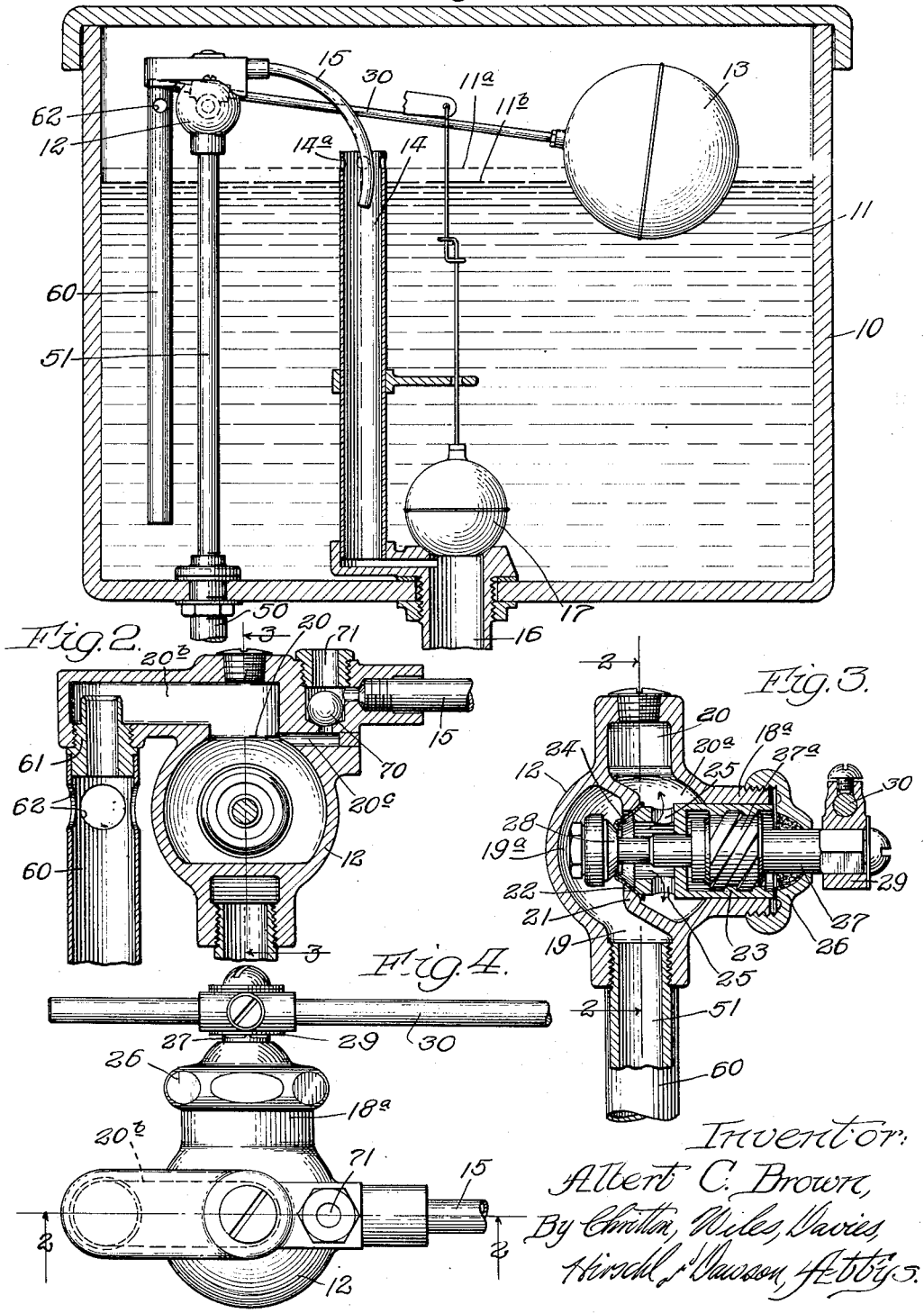
Inventor:
Albert C. Brown,
By Chritton, Wiles, Davies
Hirsch & Dawson, Attys.

Patented Sept. 12, 1939

2,173,070

UNITED STATES PATENT OFFICE 2,173,070

VALVE AND WATER SUPPLY MECHANISM

Albert C. Brown, Chicago, Ill.

Application March 2, 1939, Serial No. 259,459

5 Claims. (Cl. 137—68)

This invention relates to improvements in valve and water supply mechanism and more especially, such mechanism in connection with a valve adapted for use in controlling the supply to a water closet tank, such a valve being commonly known as a ball cock.

Among the features of my invention, is the provision of such a valve that is siphon-proof. In many municipalities now, there is a requirement that, in the event of failure of pressure, and an open valve, there can be no siphoning back into the supply pipe. One of the features of my invention is the provision of a valve of the character described that cannot siphon any water from the tank back into the supply, even though the valve is open and the pressure is lowered or fails.

Another feature of the invention is the provision of means for preventing diversion of the small flow of water, just before the valve closes, into the refill pipe.

Other features and advantages of my invention will appear more fully as I proceed with my specification.

In that form of the device embodying the features of my invention shown in the accompanying drawing, Fig. 1 is a vertical sectional view, Fig. 2 is a vertical sectional view, on an enlarged scale, of the valve structure, taken on the line 2 of Fig. 3, or the line 2 of Fig. 4, Fig. 3 is a view taken as indicated by the line 3 of Fig. 2, and Fig. 4 is a top plan view.

As shown in the drawing, 10 indicates a tank, for example, a water closet supply or flush tank; 11 the water therein; 12 the ball cock controlled by the float 13; 14 the overflow; 15 the bowl refill pipe; and 16 the outlet or flush pipe controlled by the rubber ball valve 17.

The holes 14$^a$ in the top of the overflow pipe 14 determine the maximum water lever, as indicated by the dotted line 11$^a$. The normal water level at which the valve 12 closes is preferably somewhat below this point, for example, as indicated by the line 11$^b$. 50 indicates the water supply pipe connecting with the supply pipe 51 in the tank, controlled by the valve 12, which is operated by the float 13. The valve 12 includes the substantially spherical casing with the inlet opening 19, and outlet opening 20 leading to the inlet and outlet chambers 19$^a$ and 20$^a$, respectively, separated by the partition or diaphragm 21, with the opening 22 therein.

At one side, opposite the hole 22, the casing 12 is provided with an exteriorly threaded cylindrical extension 18$^a$, adapted to receive the valve mechanism, to be hereinafter described.

The valve mechanism includes a cylindrical sleeve 23 with a removable valve seat 24 at the inner end. 25, 25 indicate holes for the passage of water, as indicated by the arrows.

26 indicates a cap screwed onto the extension 18$^a$ to cover the same and hold the sleeve in place. 27 indicates a valve stem rotatably mounted in the sleeve and extending through the cap. This stem carries a valve disk 28 on its inner end, cooperating with the seat 24 by longitudinal movement of the stem to open or close the valve. The outer end of the stem 27 is suitably squared and tapered to receive the fitting 29 which holds one end of the stem 30, carrying the float 13.

The stem 27 carries an enlarged portion 27$^a$, threaded in the sleeve 23, so that upward movement of the float 13 moves the disk 28 to close the valve, and downward movement opens the valve. The float is adjusted so the valve will close when the water reaches the height indicated by the normal water line 11$^b$.

The entire valve 12 is preferably located above the normal water line and also above the maximum water line. The outlet 20 of the valve connects by the conduit 20$^b$ with the upper end of the fill pipe 60. The connection between the conduit 20$^b$ and the pipe 60 is made by means of the nipple 61 projecting a short distance up into the conduit 20$^b$ so that water issuing from the nipple will be formed into more or less of a solid stream, and not spray or scatter. The upper end of the fill pipe 60 is provided with the vent holes 62; and it is essential that these holes at all times be above the water level. Consequently, as here shown, these vent holes 62 are located above the maximum water line 11$^a$. By this construction, it will be seen that if the water pressure in the supply pipe 50 at any time fails when the valve 12 is open, there is no possibility of any water being sucked or siphoned back from the tank 10. The vent holes 62 operate to admit air at this point to break the siphon so no water can be sucked back from the tank.

As stated above, 15 indicates the refill pipe leading from the valve 12 into the top of the overflow pipe 14 to refill the bowl (not shown) after it has been flushed. Water enters this refill pipe 15 from the valve 12 through the small conduit 20$^c$. 70 indicates a ball lying under the vent opening 71. Normal water pressure in the conduit 20$^c$ serves to raise the ball 70 sufficiently to close the vent 71 so that the water will flow into the refill pipe 15. It will be seen that the lower end of the refill pipe is preferably located inside of the overflow tube 14 and therefore at a lower level than the valve 12. With this construction, it will be seen that as the valve 12 is about to close, water in the bowl refill pipe 15 might act as a siphon to divert all of the water issuing through the valve 12 into the pipe 15 and entirely rob the supply pipe 60 of water. If this should occur, it will be seen that the valve 12 never would close completely. In order to prevent such a condition, the vent 71 with the ball 70 is provided so that if water in the pipe 15 ever starts to siphon or suck water from the valve 12, the ball 70 will drop to open the vent 71 and break this siphon. This will insure that any small flow of water through the valve 12, occurring just before this valve closes, will not be entirely diverted into the refill pipe 15 by siphoning or suction caused by water already in this pipe. In other words, water will not flow from the valve 12 into the refill pipe 15 unless there is sufficient pressure of water issuing from the valve 12 in the outlet chamber 20 also to cause the flow of water from the valve 12 into the fill pipe 60 to continue filling the tank 10.

While I have shown and described certain embodiments of my invention, it is to be understood that it is capable of many modifications. Changes therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. Mechanism of the character described, including: a tank with an overflow; a supply pipe; a fill pipe; a connection between the supply pipe and fill pipe; a float controlled valve in said connection; a bowl refill pipe leading from said connection to the overflow with the outlet below said connection; a vent in said refill pipe; and means for causing pressure in said refill pipe to close said vent.

2. Mechanism of the character described, including: a tank with an overflow; a supply pipe; a float controlled valve on the supply pipe; a fill pipe connected to said valve, said fill pipe having a vent opening above the overflow; a bowl refill pipe leading from the valve to the overflow with its outlet below said vent in said fill pipe; a vent in said refill pipe; and means for causing pressure in said refill pipe to close said vent in said refill pipe.

3. Mechanism of the character described, including: a tank with an overflow; a supply pipe; a float controlled valve on the supply pipe; a fill pipe and a bowl refill pipe both branching from the discharge of the float valve, the outlet of the refill pipe being below said branch; a vent in said refill pipe; and means for causing pressure in said refill pipe to close said vent.

4. Mechanism of the character described, including: a tank with an overflow; a supply pipe; a float controlled valve on the supply pipe with discharge means having a vent to atmosphere above the overflow; a bowl refill pipe connected to the discharge means of the float controlled valve on the supply pipe, the outlet of said refill pipe being below said vent to atmosphere; a vent in the refill pipe; and means for causing pressure in said refill pipe to close said vent.

5. Mechanism of the character described, including: a tank with an overflow; a supply pipe; a float controlled valve on the supply pipe having discharge means; a small bowl refill pipe connected to said discharge means with its outlet below said discharge means; and a pressure closed vent in said refill pipe whereby siphoning action in said refill pipe can not rob said supply pipe of its entire discharge when said discharge is reduced to a small amount by the float valve.

ALBERT C. BROWN.